United States Patent
Nishimura et al.

(10) Patent No.: US 11,807,267 B2
(45) Date of Patent: Nov. 7, 2023

(54) SYSTEMS AND METHODS FOR RISK-SENSITIVE SEQUENTIAL ACTION CONTROL FOR ROBOTIC DEVICES

(71) Applicants: Toyota Research Institute, Inc., Los Altos, CA (US); The Board of Trustees of the Leland Stanford Junior University, Stanford, CA (US)

(72) Inventors: Haruki Nishimura, Stanford, CA (US); Boris Ivanovic, Stanford, CA (US); Adrien David Gaidon, Mountain View, CA (US); Marco Pavone, Stanford, CA (US); Mac Schwager, Stanford, CA (US)

(73) Assignees: Toyota Research Institute, Inc., Los Altos, CA (US); THE BOARD OF TRUSTEES OF THE LELAND STANFORD JUNIOR UNIVERSITY, Stanford, CA (US)

( * ) Notice: Subject to any disclaimer, the term of this patent is extended or adjusted under 35 U.S.C. 154(b) by 243 days.

(21) Appl. No.: 17/139,105

(22) Filed: Dec. 31, 2020

(65) Prior Publication Data
US 2022/0204030 A1 Jun. 30, 2022

(51) Int. Cl.
*B60W 60/00* (2020.01)
*B60W 30/09* (2012.01)
(Continued)

(52) U.S. Cl.
CPC ........ *B60W 60/0011* (2020.02); *B60W 30/09* (2013.01); *B60W 30/0956* (2013.01);
(Continued)

(58) Field of Classification Search
CPC ............ B60W 60/0011; B60W 30/09; B60W 30/0956; B60W 60/00274;
(Continued)

(56) References Cited

U.S. PATENT DOCUMENTS

| 8,543,261 B2 | 9/2013 | Anderson et al. |
| 10,591,929 B2 | 3/2020 | Shalev-Shwartz et al. |

(Continued)

OTHER PUBLICATIONS

A. Mavrommati, J. Schultz and T. D. Murphey, "Real-Time Dynamic-Mode Scheduling Using Single-Integration Hybrid Optimization," in IEEE Transactions on Automation Science and Engineering, vol. 13, No. 3, pp. 1385-1398, Jul. 2016, doi: 10.1109/TASE.2016.2570141. (Year: 2016).*

(Continued)

*Primary Examiner* — Ian Jen
*Assistant Examiner* — Danielle Marie Jackson
(74) *Attorney, Agent, or Firm* — Christopher G. Darrow; Darrow Mustafa PC (57) ABSTRACT

Systems, methods, and other embodiments described herein relate to improving controls in a device according to risk. In one embodiment, a method includes, in response to receiving sensor data about a surrounding environment of the device, identifying objects from the sensor data that are present in the surrounding environment. The method includes generating a control sequence for controlling the device according to a risk-sensitivity parameter to navigate toward a destination while considering risk associated with encountering the objects defined by the risk-sensitivity parameter. The method includes controlling the device according to the control sequence.

20 Claims, 5 Drawing Sheets

(51) Int. Cl.
  *B60W 30/095* (2012.01)
  *G06V 20/58* (2022.01)
(52) U.S. Cl.
  CPC ....... *B60W 60/00274* (2020.02); *G06V 20/58* (2022.01); *B60W 2554/80* (2020.02)
(58) Field of Classification Search
  CPC ......... B60W 2554/80; B60W 50/0097; B60W 2050/0031; B60W 2520/00; B60W 2520/10; B60W 2556/50; G06V 20/58
  See application file for complete search history.

(56) References Cited

U.S. PATENT DOCUMENTS

| | | | | |
|---|---|---|---|---|
| 11,521,396 | B1* | 12/2022 | Jain | G05D 1/0088 |
| 2016/0202670 | A1* | 7/2016 | Ansari | G05B 13/026 700/45 |
| 2016/0299507 | A1 | 10/2016 | Shah et al. | |
| 2018/0268281 | A1 | 9/2018 | Olson et al. | |
| 2019/0295179 | A1 | 9/2019 | Shalev-Shwartz et al. | |
| 2019/0315345 | A1 | 10/2019 | Newman et al. | |
| 2021/0192748 | A1* | 6/2021 | Morales Morales | G06F 18/23213 |
| 2021/0373513 | A1* | 12/2021 | Quirynen | G05B 13/0275 |
| 2022/0089192 | A1* | 3/2022 | Gyllenhammar | B60W 30/0956 |
| 2022/0194430 | A1* | 6/2022 | Sugama | B60W 30/095 |
| 2022/0198225 | A1* | 6/2022 | Choi | G05D 1/0251 |

OTHER PUBLICATIONS

Lerner et al.; Crowds by Example; Computer Graphics, 2007, pp. 655-664, vol. 26, No. 3. Eurographics 2007.
Wang, et al., "Ouijabots: Omnidirectional Robots for Cooperative Object Transport with Rotation Control Using No Communication," in Distributed Autonomous Robotic Systems Springer, 2018, pp. 117-131.
Kingma, et al., "Adam: A method for stochastic optimization," afound at: arXiv:1412.6980v1 [cs.LG] Dec. 22, 2014.
Zhou et al., Fast, Online Collision Avoidance for Dynamic Vehicles Using Buffered Voronoi Cells, IEEE Robotics and Automation Letters, Apr. 2017, pp. 1047-1054, vol. 2, No. 2, Researchgate.net.
Wang, et al., "Safe Distributed Lane Change Maneuvers for Multiple Autonomous Vehicles Using Buffered Input Cells", IEEE International Conference on Robotics and Automation (ICRA) IEEE, 2018, pp. 1-7, http://web.stanford.edu/~schwager/MyPapers/WangEtAlICRA18BICLaneChange.pdf.
Myvaganam, et al., "A Differential Game Approach to Multi-agent Collision Avoidance", IEEE Transactions on Automatic Control, 2017, pp. 4229-4235, vol. 62, No. 8, https://ieeexplore.ieee.org/stamp/stamp.jsparnumber=7909033.
Wang, et al., "Safety Barrier Certificates for Collisions-free Multirobot Systems", IEEE Transactions on Robotics, Jun. 2017, pp. 661-674, vol. 33, No. 3, found at: http://ames.caltech.edu/wang2017safety.pdf.
Lou, et al., "Multi-robot Collision Avoidance Under Uncertainty with Probabilistic Safety Barrier Certificates", found at: arXiv:1912.09957V1 [cs RO] Dec. 20, 2019.
Tomlin, et al., "Conflict Resolution for Air Traffic Management: A Study in Multiagent Hybrid Systems", IEEE Transactions on Automatic Control, Apr. 1998, pp. 509-521,vol. 43, No. 4, https://people.eecs.berkeley.edu/~sastry/pubs/OldSastryALL/TomlinConflicResolution1998.pdf.
Chen, "Multi-Vehicle Collision Avoidance Va Hamilton-Jacobi Reachability and Mixed Integer Programming", found at: arXiv:1603.05200v2 [cs.SY] Oct. 4, 2016.
Temizer, et al., "Collision Avoidance for Unmanned Aircraft Using Markov Decision Processes", AIAA Guidance, Navigation, and Control Conference, Aug. 2-5, 2010, pp. 1-23, Toronto, Ontario, https://dspace.mit.edu/bitstream/handle/1721.1/61341/Kaelbling_Collision%20avoidance.pdf?sequence=1&isAllowed=y.
Cai, et al.,"Hyp-despot: A Hybrid Parallel Algorithm for Online Planning Under Uncertainty", found at: arXiv:1802.06215v1 [cs AI] Feb. 17, 2018.
Schmerling, et al., "Multimodal probabilistic model-based planning for human-robot interaction", found at: arXiv:1710.09483V1 [cs RO] Oct. 25, 2017.
Gomez, et al., "Real-time Stochastic Optimal Control for Multi-agent Quadrotor Systems," Twenty-Sixth International Conference on Automated Planning and Scheduling (ICAPS), 2016, pp. 468-476.
Williams, et al., "Best Response Model Predictive Control for Agile Interactions Between Autonomous Ground Vehicles", IEEE International Conference on Robotics and Automation (ICRA) May 21-25, 2018, pp. 2403-2410, Brisbane, Australia, https://par.nsf.gov/servlets/purl/10077892.
Blackmore, et al., "Chance-Constrained Optimal Path Planning with Obstacles", IEEE Transactions on Robotics, Dec. 2011, pp. 1080-1094, vol. 27, No. 6, https://dspace.mit.edu/bitstream/handle/1721.1/80914/Williams_Chance-constrained.pdf?sequence=1&isAllowed=y.
Samuelson, et al., "Safety-aware Optimal Control of Stochastic Systems Using conditional value-at-risk", found at arXiv:1802.07903v1 [math.OC] Feb. 22, 2018.
Medina, "Risk-sensitive Optimal Feedback Control for Haptic Assistance", 2012 IEEE International Conference on Robotics and Automation, RiverCentre, Saint Paul, Minnesota May 14-18, 2012, pp. 1025-1031, https://mediatum.ub.tum.de/doc/1160730/file.pdf.
Pokle, et al., "Deeplocal Trajectory Replanning and Control for Robot Navigation," found at: arXiv:1905.05279v1 [cs. RO] May 13, 2019.
Everett, et al., "Motion Planning Among Dynamic, Decision-making Agents with Deep Reinforcement Learning", found at: arXiv:1805.01956v1 [cs RO] May 4, 2018.
Chen, et al., "Crowd-robot Interaction: Crowd-aware Robot Navigation with Attention-based Deep Reinforcement Learning," found at: arXiv:1809.08835v2 [cs.RO] Feb. 19, 2019.
Tzorakoleftherakis, et al., "Iterative Sequential Action Control for Stable, Model-based Control of Nonlinear Systems", found at: arXiv:1706.08932v2 [cs.RO] Oct. 26, 2018.
Pellegrini, et al., "You'll Never Walk Alone: Modeling Social Behavior for Multi-target Tracking," in 2009 IEEE 12th International Conference on Computer Vision. IEEE, 2009, pp. 261-268.
Sohn, et al., "Learning structured Output Representation Using Deep Conditional Generative Models," in Conf. on Neural Information Processing Systems, 2015.
Goodfellow, et al., "Generative Adversarial Nets," in Conf. on Neural Information Processing Systems, 2014.
Ivanovic, et al., "The Trajectron: Probabilistic Multi-agent Trajectory Modeling with Dynamic Spatiotemporal Graphs," in Proceedings of the IEEE International Conference on Computer Vision, 2019, pp. 2375-2384.
Gupta et al., "Social GAN: Socially Acceptable Trajectories with Generative Adversarial Networks," in IEEE Conf. on Computer Vision and Pattern Recognition, 2018.
Mellinger et al. "Mixed-integer quadratic program trajectory generation for heterogeneous quadrotor teams," in 2012 IEEE international conference on robotics and automation. IEEE, 2012, pp. 477-483.
Van Den Berg et al., "Reciprocal n-body collision avoidance," in Robotics research. Springer, 2011, pp. 3-19.
Glover et al., Abstract of "Relations between H∞ and risk sensitive controllers", in Analysis and Optimization of Systems. Springer, 1988, pp. 1-10.
Whittle, Abstract of "Risk-sensitive linear/quadratic/gaussian control," Advances in Applied Probability, vol. 13, No. 4, pp. 764-777, 1981.
Salzmann et al., "Trajectron++ Dynamically-Feasible Trajectory Forecasting With Heterogeneous Data", found at: arXiv:2001.03093v3 [cs.RO] Jun. 1, 2020.

(56) References Cited

OTHER PUBLICATIONS

Nishimura et al., SACBP: Belief Space Planning for Continuous-Time Dynamical Systems via Stochastic Sequential Action Control, in The 13th International Workshop on the Algorithmic Foundations of Robotics (WAFR), 2018.
Majumdar et al., "How Should A robot Assess Risk? Towards an Axiomatic Theory of Risk in Robotics", found at: arXiv:1710.11040v2 [cs.RO] Nov. 1, 2017.
Whittle, "Risk Sensitivity, A Strangely Pervasive Concept", Macroeconomic Dynamics, 6, 2002, 5-18.
Wardi et al. "Algorithm for Optimal Mode Scheduling in Switched Systems", 2012 American Control Conference (ACC), Montreal, QC, 2012, pp. 4546-4551.
Ansari et al. "Sequential Action Control Closed-Form Optimal Control for Nonlinear and Nonsmooth Systems", found at: arXiv:1708.09347v1 [cs.RO] Aug. 30, 2017.

\* cited by examiner

SYSTEMS AND METHODS FOR RISK-SENSITIVE SEQUENTIAL ACTION CONTROL FOR ROBOTIC DEVICES

TECHNICAL FIELD

The subject matter described herein relates, in general, to systems and methods for generating controls that consider risk for a robotic device and, more particularly, to applying a stochastic sequential action control approach that is risk-sensitive to provide optimal control of the robotic device in dynamic environments.

BACKGROUND

As autonomous robots (e.g., autonomous vehicles) become more common, the likelihood of encounters between autonomous robots and other agents, such as humans, other vehicles, etc., becomes more likely. Thus, the autonomous robots must avoid collisions with the other agents for the sake of safety and the continued practicality of using such systems. Safe and efficient navigation alongside other agents is a challenging problem due to the unpredictable and uncooperative nature of the motion of other agents. Moreover, incorporating risk-sensitivity into the decision making of the robot may provide improved navigation, but has proven to be an elusive goal. For example, various approaches to resolving the noted difficulties, such as chance-constrained optimization, conditional value at risk (CVaR), and entropic risk, generally suffer from difficulties, such as non-Gaussian noise, nonlinear dynamics, and non-continuity. As such, current solutions are inefficient for the noted reasons and thus have limited applicability in resolving safe autonomous robot control.

SUMMARY

In one embodiment, example systems and methods relate to a manner of improving the generation of controls for an autonomous robot using stochastic sequential action control that is risk sensitive. As indicated previously, avoiding collisions with other agents can be a difficult task. Integrating an understanding of risk into control sequences for robots in order to improve collision avoidance has proven to be elusive for other approaches. While various approaches may leverage risk in the creation of controls, these systems suffer from computational inefficiencies due to non-continuities, non-Gaussian noise, and other difficulties.

Therefore, in at least one arrangement, a control system implements a sequential action control (SAC) algorithm in a risk-sensitive setting through the use of an entropic risk measure. That is, the risk-sensitive SAC algorithm (also referred to as RSSAC herein) is a sampling-based nonlinear model-predictive control algorithm that optimally improves upon a given nominal control with a series of control perturbations. Moreover, the control system further leverages a machine-learning approach for modeling multi-agent behavior in the form of a generative model for predicting many possible future trajectories of interacting agents (e.g., pedestrians, vehicles, etc.) that provides samples of predicted motion for other agents into the RSSAC. Thus, the control system implements an overall framework that is a prediction-control pipeline for safe robot navigation, and that can interact with many agents simultaneously in real-time while avoiding collisions and steering the device toward a destination.

In one embodiment, a control system for improving controls in a device according to risk is disclosed. The calibration system includes one or more processors and a memory communicably coupled to the one or more processors. The memory stores a detection module including instructions that, when executed by the one or more processors, cause the one or more processors to, in response to receiving sensor data about a surrounding environment of the device, identify objects from the sensor data that are present in the surrounding environment. The memory stores a control module including instructions that, when executed by the one or more processors, cause the one or more processors to generate a control sequence for controlling the device according to a risk-sensitivity parameter to navigate toward a destination while considering risk associated with encountering the objects defined by the risk-sensitivity parameter, and to control the device according to the control sequence.

In one embodiment, a non-transitory computer-readable medium for improving controls in a device according to risk and including instructions that, when executed by one or more processors, cause the one or more processors to perform one or more functions is disclosed. The instructions include instructions to, in response to receiving sensor data about a surrounding environment of the device, identify objects from the sensor data that are present in the surrounding environment. The instructions include instructions to generate a control sequence for controlling the device according to a risk-sensitivity parameter to navigate toward a destination while considering risk associated with encountering the objects defined by the risk-sensitivity parameter. The instructions include instructions to control the device according to the control sequence.

In one embodiment, a method for improving controls in a device according to risk is disclosed. In one embodiment, a method includes, in response to receiving sensor data about a surrounding environment of the device, identifying objects from the sensor data that are present in the surrounding environment. The method includes generating a control sequence for controlling the device according to a risk-sensitivity parameter to navigate toward a destination while considering risk associated with encountering the objects defined by the risk-sensitivity parameter. The method includes controlling the device according to the control sequence.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Systems, methods, and other embodiments associated with improving the generation of controls for an autonomous robot using stochastic sequential action control that is risk-sensitive are disclosed. As indicated previously, avoiding collisions with other agents can be a difficult task. Integrating an understanding of risk into control sequences for robots in order to improve collision avoidance has proven to be elusive for other approaches. While various approaches may leverage risk in the creation of controls, such systems suffer from computational inefficiencies due to non-continuities, non-Gaussian noise, and other difficulties.

Therefore, in at least one arrangement, a control system implements a sequential action control (SAC) algorithm in a risk-sensitive setting through the use of an entropic risk measure. That is, the risk-sensitive SAC algorithm (also referred to as RSSAC herein) is a sampling-based nonlinear model-predictive control algorithm that optimally improves upon a given nominal control with a series of control perturbations. Moreover, the control system further leverages a machine-learning approach for modeling multi-agent behavior in the form of a generative model for predicting many possible future trajectories of interacting agents (e.g., pedestrians, vehicles, etc.) that provides samples of predicted motion for other agents into the RSSAC. Thus, the control system implements an overall framework that is a prediction-control pipeline for safe robot navigation, and that can interact with many agents simultaneously in real-time while avoiding collisions and steering the device toward a destination.

For example, in at least one configuration, the control system, which is generally included as part of an autonomous device (e.g., an autonomous vehicle or other robots), receives sensor data about a surrounding environment. From this sensor data, the control system identifies objects, such as vehicles, pedestrians, etc. In general, these objects represent potential hazards to the autonomous device, and thus it is desirable to avoid collisions with such objects. To achieve collision avoidance as a single stream process that is part of control generation, the control system integrates a risk parameter that quantifies an extent of risk the device is to undertake in generating the controls. For example, providing the risk parameter with a high value results in the control system generating sequences of controls that are risk-averse and avoid close encounters with the objects. By contrast, providing the risk parameter with a low value results in the control system generating controls that are riskier and thus may approach the objects more closely. Of course, the control system may define the risk parameter along a continuum in order to provide a risk parameter that is suitable for the autonomous device.

In any case, the control system uses information about the objects to predict trajectories for the objects, which the control system uses in turn in combination with the RSSAC algorithm to generate the controls. For example, the control system uses the RSSAC algorithm to perform mode insertion gradient optimization of a risk objective embodied by the risk parameter using dynamics of the device and sampled costs associated with the trajectories. Thus, the control system may integrate various portions of information, including further simulating the dynamics of the autonomous device to refine a control sequence in order to account for the risk, and, thereby, improve the control sequence overall.

Figure 1:
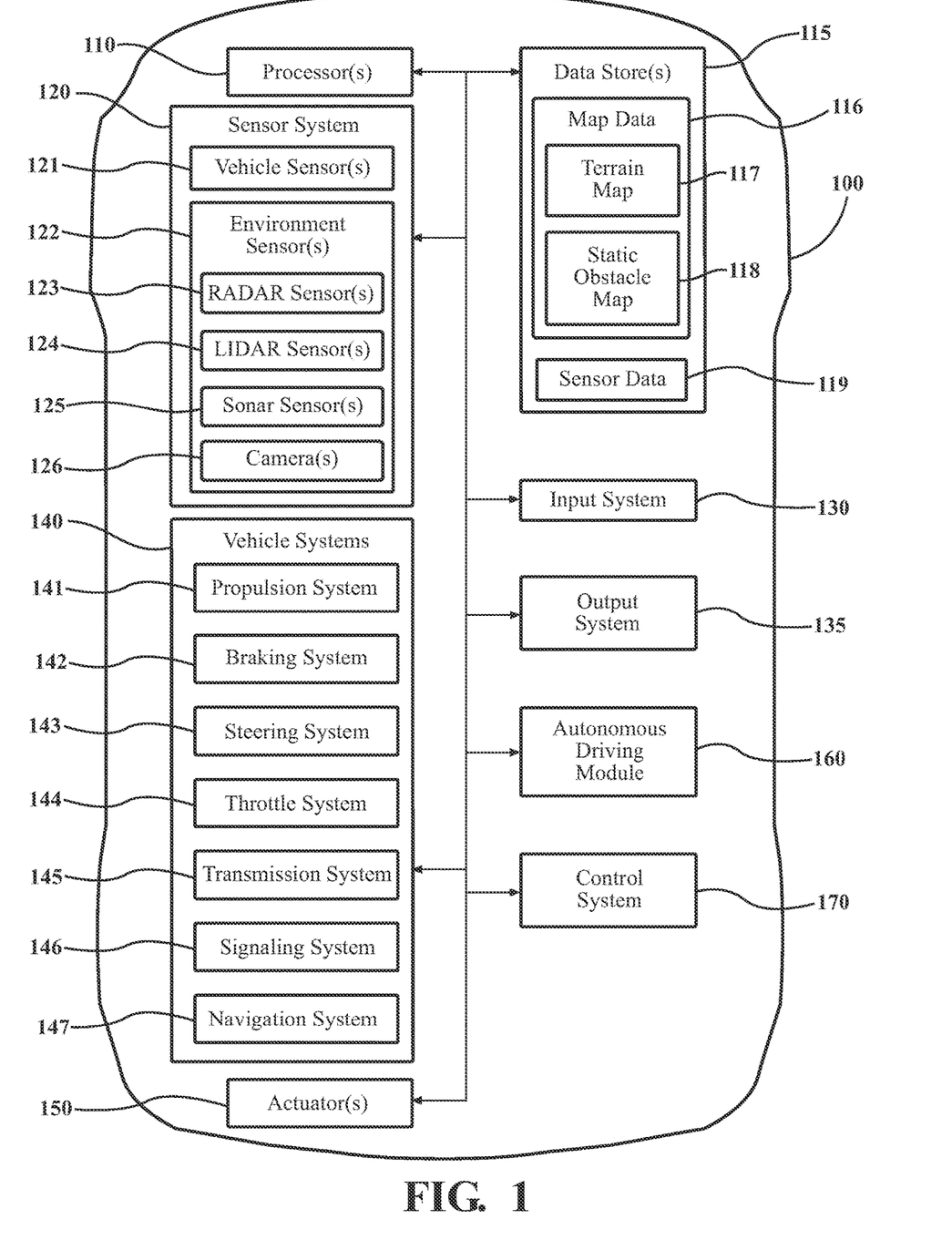
FIG. 1 illustrates one embodiment of a vehicle within which systems and methods disclosed herein may be implemented.

Referring to FIG. 1, an example of a vehicle 100 is illustrated. As used herein, a "vehicle" is any form of powered transport. In one or more implementations, the vehicle 100 is an automobile. While arrangements will be described herein with respect to automobiles, it will be understood that embodiments are not limited to automobiles but are generally described in relation to automobiles for purposes of description. In yet further embodiments, the vehicle 100 may instead be an embedded device, or another device that generates controls for a device to autonomously navigate through an environment.

In any case, the vehicle 100 also includes various elements. It will be understood that, in various embodiments, it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are illustrated as being located within the vehicle 100, it will be understood that one or more of these elements can be located external to the vehicle 100. Further, the elements shown may be physically separated by large distances and provided as remote services (e.g., cloud-computing services, software-as-a-service (SaaS), etc.).

Some of the possible elements of the vehicle 100 are shown in FIG. 1 and will be described along with subsequent figures. However, a description of many of the elements in FIG. 1 will be provided after the discussion of FIGS. 2-5 for purposes of the brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements.

In any case, the vehicle 100 includes a control system 170 that functions to process sensor data into observations about a surrounding environment and objects therein from which the control system 170 generates sequences of controls for controlling the vehicle 100. Moreover, while depicted as a stand-alone component, in one or more embodiments, the control system 170 is integrated with the automation module 160, or another component of the vehicle 100. The noted functions and methods will become more apparent with a further discussion of the figures.

Figure 2:
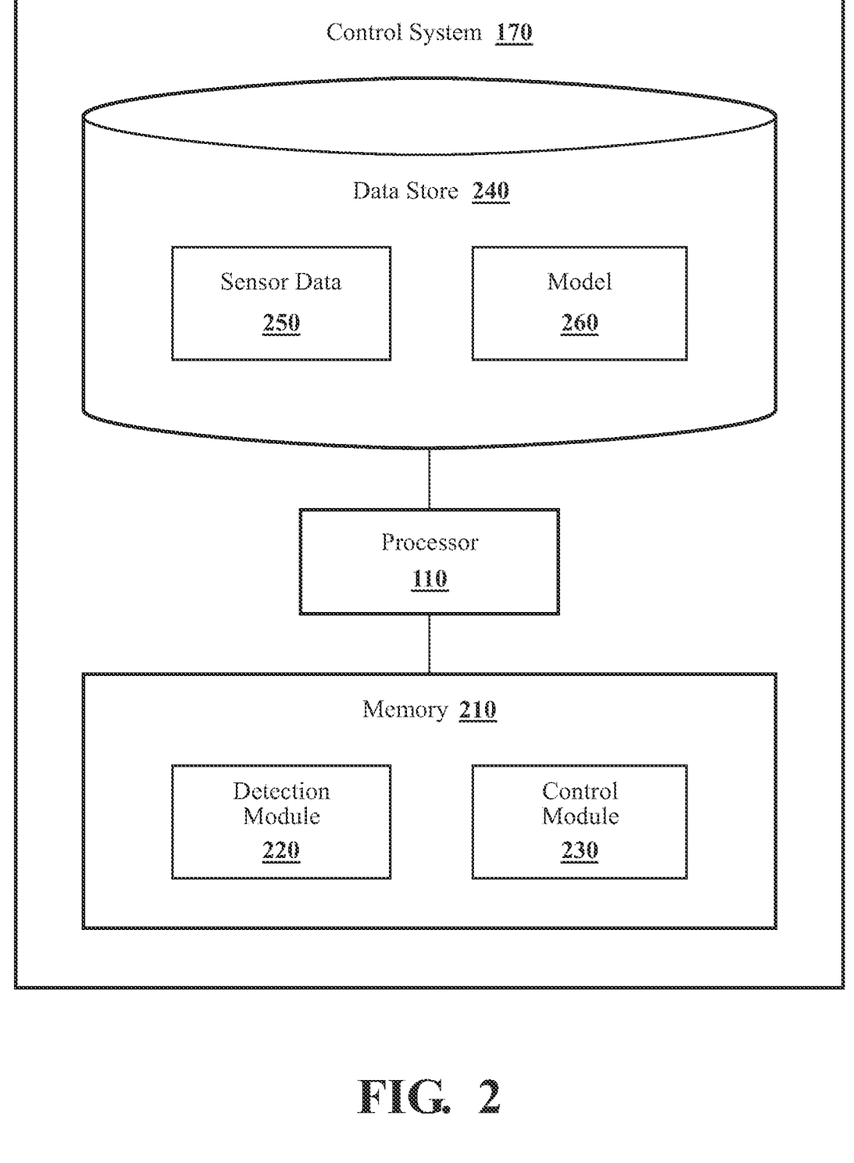
FIG. 2 illustrates one embodiment of a control system that is associated with risk-sensitive control generation for a device.

With reference to FIG. 2, one embodiment of the control system 170 is further illustrated. The control system 170 is shown as including a processor 110. Accordingly, the processor 110 may be a part of the control system 170, or the control system 170 may access the processor 110 through a data bus or another communication path. In one or more embodiments, the processor 110 is an application-specific integrated circuit (ASIC) that is configured to implement functions associated with a detection module 220 and a control module 230. In general, the processor 110 is an electronic processor such as a microprocessor that can perform various functions as described herein. In one embodiment, the control system 170 includes a memory 210 that stores the detection module 220 and the control module 230. The memory 210 is a random-access memory (RAM), read-only memory (ROM), a hard disk drive, a flash memory, or other suitable memory for storing the modules 220 and 230. The modules 220 and 230 are, in at least one arrangement, computer-readable instructions that, when executed by the processor 110, cause the processor 110 to perform the various functions disclosed herein. As such, in one or more aspects, the modules 220 and 230 impart structure to the control system 170 in the form of the instructions stored in the memory 210, associations with the structure of the processor 110 as dictated by opcode, and the structure of algorithms implemented by the modules 220 and 230.

Furthermore, in one embodiment, the control system 170 includes a data store 240. The data store 240 is, in one embodiment, an electronic data structure stored in the memory 210 or another electronic storage, and that is configured with routines that can be executed by the processor 110 for analyzing stored data, providing stored data, organizing stored data, and so on. Thus, in one embodiment, the data store 240 stores data used by the modules 220 and 230 in executing various functions. In one embodiment, the data store 240 includes sensor data 250, and a model 260 along with, for example, other information that is used by the modules 220 and 230.

Accordingly, the detection module 220, in one embodiment, controls the one or more respective sensors to provide the data inputs in the form of the sensor data 250. Additionally, while the detection module 220 is discussed as controlling the various sensors to provide the sensor data 250, in one or more embodiments, the detection module 220 can employ other techniques to acquire the sensor data 250 that are either active or passive. For example, the detection module 220 may passively sniff the sensor data 250 from a stream of electronic information provided by the various sensors to further components within the vehicle 100. Moreover, the detection module 220 can undertake various approaches to fuse data from multiple sensors when providing the sensor data 250 and/or from sensor data acquired over a wireless communication link. Thus, the sensor data 250, in at least one arrangement, represents a combination of perceptions acquired from multiple sensors.

In general, the sensor data 250 includes information about a surrounding environment by the one or more sensors that acquire the sensor data 250. That is, the sensor data 250 includes perceptions from the one or more sensors within a field-of-view of the sensor(s) making the perception. Thus, the sensor data 250 includes observations of the surrounding environment that depend on the field-of-view of the sensor and placement of the sensor in the environment. Within the context of the vehicle 100, the sensor data 250 may include observations of surrounding vehicles, pedestrians, and other objects, including aspects relating to a road environment, such as curbs, lane markings, buildings, traffic signs, and so on. Of course, within other contexts (e.g., indoor), the observations embodied within the sensor data 250 may differ. It should be appreciated that the areas perceived by the sensor(s) may encompass 360 degrees about the vehicle 100 or a narrower perspective. In any case, the sensor data 250 includes information about the surrounding environment of a perceiving sensor.

The sensor data 250 itself can include a single form of data (e.g., a point cloud) or a combination of different data from different sources, such as images, radar returns, point clouds, and so on. The sensors may include a LiDAR, a radar, a camera, a sonar, or another suitable sensor. In yet a further aspect, the detection module 220, the automation module 160, or another component may derive additional information from the sensor data 250.

With further reference to FIG. 2, the control system 170 further includes the model 260. In one or more arrangements, the model 260 performs one or more of instance segmentation, classification, trajectory forecasting, and control generation. In any case, the model 260 functions to identify discrete objects from the sensor data 250 that are present in a scene. From this the model 260 can use derived data to perform the noted additional functions. It should be appreciated that the model 260 may be formed of multiple separate models that, when executed in a collaborative manner, function to perform the noted functions.

In various approaches, the model 260 includes a risk-sensitive sequential action control (RSSAC) algorithm that integrates the consideration of risk in a single stream process with generating the controls. The RSSAC algorithm is a novel sampling-based stochastic model predictive control algorithm that is based on performing mode insertion gradient optimization of a risk objective when given dynamics of the vehicle 100 along with samples of trajectories for the identified objects in the surrounding environment.

Accordingly, the control module 230 uses the information from the detection module 220 about the surrounding environment, including the identified objects in combination with the RSSAC algorithm to iteratively generate controls for the vehicle 100. As a further explanation of the RSSAC algorithm and how the control module 230 integrates risk into the algorithm consider the following discussion.

In at least one arrangement, the control module 230 assumes a discrete-time dynamical system model for identified agents (e.g., vehicles, pedestrians, etc.) while employing a continuous model for the vehicle 100. These assumptions relate to the frequency of data acquisition by the detection module 220 and the frequency at which the control module 230 updates control sequences. Accordingly, let $\dot{x}(t) \in \mathbb{R}^n$ denote the state of the vehicle 100 at time t, whose dynamics are modeled by $$\dot{x}(t)=f(x(t))+H(x(t))u(t) \qquad (1)$$

where $u(t) \in \mathcal{U} \subseteq \mathbb{R}^m$ is the control, and $\mathcal{U}$ is a bounded convex set. In general, the present approach assumes that the dynamics are deterministic and control-affine. As the vehicle 100 navigates in the environment, the detection module 220 receives the sensor data 250 indicating position information on identified objects in the scene and updates at discrete times $\{t_k\}_{k \geq 0}$, with interval time $\Delta t_o$. Let $p^i(t_k) \in \mathbb{R}^2$ denoting the position of the identified object label $i \in \{1, \ldots, N\}$. From time $t_{k-1}$ to $t_k$, the position $p^i(t_{k-1})$ changes to $p^i(t_k)$ with difference $y_k^i$. From the continuous-time perspective of the vehicle 100, this is viewed as a periodic jump discontinuity given by:

$$\begin{cases} p^i(t_k) = p^i(t_k^-) + y_k^i \\ p^i(t) = p^i(t_k) \qquad \forall t \in [t_k, t_{k+1}) \end{cases} \qquad (2)$$

Where $t_k^-$ is infinitesimally smaller than $t_k$. The dynamics of the joint state $s(t)=x(t), p^1(t), \ldots, p^N(t))$ are specified by (1) and (2), which together constitute a hybrid dynamical system with time-driven switching. For purposes of discussion, the present discussion treats N as a fixed number for simplicity, but this constraint can be relaxed to handle a time-varying number of identified objects via re-planning.

The control system 170 plans controls over a finite horizon $[t_0, t_T]$ while the identified objects make stochastic transitions $\{y_k^i\}_{(1 \le i \le N, 1 \le k \le T)}$. A random vector with distribution $\mathcal{D}$ is obtained by stacking the transition variables. The form of $\mathcal{D}$ may or may not be known, and can be dependent on the past history of interactions and/or future plan of the vehicle 100. For the sake of planning, samples drawn from $\mathcal{D}$ are to be available. In the control system 170, model $\mathcal{D}$ (i.e., model 260) may include a probabilistic trajectory forecasting model that utilizes a discrete Categorical latent variable to explicitly model multimodality. This model is further referred to herein as the generative behavior prediction model.

In regards to optimizing the controls, consider a finite horizon optimal control cost of the form $$J = \int_{t_0}^{t_T} c(s(t), u(t)) dt + h(s(t_T)), \quad (3)$$

where $c(\cdot)$ is the instantaneous cost function and $h(\cdot)$ is the terminal cost function. Assume that $c(\cdot)$ is the LQ tracking cost plus a collision cost term:

$$c(s(t), u(t)) = \frac{1}{2}(x(t) - r(t))^T Q(x(t) - r(t)) + \frac{1}{2} u(t)^T R u(t) + c_{col}(s(t)), \quad (4)$$

where $Q = Q^T \succ 0$ and $R = R^T \succ 0$ are weight matrices, and $c_{col}(\cdot) \ge 0$ is a collision penalty function that is continuously differentiable, bounded, and has bounded gradient with respect to x. The reference trajectory r is assumed to be given, from a high-level global planner (e.g., of the automation module 160 of the vehicle 100). Similarly, the terminal cost $h(\cdot)$ is defined by:

$$h(s(t_T)) = \frac{\beta}{2}(x(t_T) - r(t_T))^T Q(x(t_T) - r(t_T)) + \beta c_{col}(s(t_T)), \quad (5)$$

$\beta \ge 0$ determines the relative weight between the terminal and instantaneous costs. Having specified the cost functional J, the (risk-neutral) stochastic optimal control problem is defined as follows (Problem 1).

$$\underset{u}{\text{minimize}} \quad \mathbb{E}_{\mathcal{D}}[J]$$

subject to $(1), (2) \forall i \in \{1, \ldots, N\} \forall k \in \{1, \ldots T\}$ $x(t_0) = x_0, \, p^i(t_0) = p_0^i \forall i \in \{1, \ldots, N\}$ $u(t) \in \mathcal{U} \forall t \in (t_0, t_T)$ The formulation of Problem 1 ignores the safety-critical aspect of collision avoidance, as simply optimizing the expected value fails to take into account the shape of the distribution. A remedy is to introduce the following entropic risk measure with risk sensitivity parameter $\sigma > 0$, as integrated into the RSSAC algorithm.

$$R_{\mathcal{D},\sigma}(J) \triangleq \frac{1}{\sigma} \log(\mathbb{E}_{\mathcal{D}}[e^{\sigma J}]). \quad (6)$$

As long as the vehicle 100 has a trajectory x that is bounded for all admissible control, J becomes a bounded random variable and $R_{\mathcal{D},\sigma}(J)$ is finite. This transformation approximately decouples the mean and variance:

$$R_{\mathcal{D},\sigma} \approx \mathbb{E}_{\mathcal{D}}[J] + \frac{\sigma}{2} \text{Var}_{\mathcal{D}}(J) \quad (7)$$

for small $\sigma \text{Var}_{\mathcal{D}}(J)$. Thus, $\sigma$ is the risk parameter that determines how much the control system 170 considers the variability of the cost in addition to the mean. Larger $\sigma$ increases risk sensitivity, while the risk-neutral objective $\mathbb{E}_{\mathcal{D}}[J]$ is recovered as $\sigma \to 0^+$. Replacing the expectation in Problem 1 with (6), provides the following risk-sensitive optimal control problem subject to the same constraints as Problem 1: Problem 2 (Risk-Sensitive Stochastic Optimal Control):

$$\underset{u}{\text{minimize}} \quad R_{\mathcal{D},\sigma}(J)$$

Solving Problem 1 is intractable in general due to potential non-convexity in $c_{col}$ and complexity in $\mathcal{D}$. An efficient, approximate model predictive control solution can be obtained via stochastic sequential action control. In this framework, the optimal perturbation of a given nominal control such that the expected value of the mode insertion gradient, which quantifies local effects of the perturbation on the cost functional J, is minimized. Assuming the nominal control is an open-loop control schedule u (although the solution can be extended to closed-loop instances). The perturbed control is defined as:

$$u^\epsilon(t) \triangleq \begin{cases} v, & \text{if } t \in (\tau - \epsilon, \tau] \\ u(t), & \text{otherwise} \end{cases}, \quad (8)$$

where $v \in \mathcal{U}$, $\tau \in (t_0, t_T)$, $\epsilon \ge 0$ are the perturbation parameters. The perturbation $u^\epsilon$ yields perturbed state trajectory $x^\epsilon$ and cost $J^\epsilon$ under a specific sample from $\mathcal{D}$. In at least one arrangement, the mode insertion gradient is the sensitivity of the cost J to the perturbation duration $\epsilon$, with v and $\tau$ fixed:

$$\left. \frac{\partial_+ J}{\partial \epsilon} \right|_\epsilon \triangleq \lim_{\epsilon \to 0^+} \left( \frac{J^\epsilon - J}{\epsilon} \right) \quad (9)$$

The value of the mode insertion gradient is given by:

$$\left. \frac{\partial_+ J}{\partial \epsilon} \right|_{\epsilon=0} = \frac{1}{2} v^T R v + \rho(t)^T H(x(\tau))(v - u(\tau)) - \frac{1}{2} u(\tau)^T R u(\tau), \quad (10)$$

where x is the trajectory of the vehicle 100 induced by nominal control u, and $\rho$ is the adjoint variable matching the dimensionality of the robot state. Specifically, it follows the ODE:

$$\dot{\rho}(t) = -\frac{\partial}{\partial x} c(s(t), u(t)) - \left( \frac{\partial}{\partial x} f(x(t)) + \frac{\partial}{\partial x} H(x(t)) u(t) \right)^T \rho(t), \quad (11)$$

with boundary condition $$\rho(t_T) = \frac{\partial}{\partial x} h(s(t_T)).$$

As this joint state s(t) is a random vector due to stochasticity in human motion, so ρ(t) and (11) is valid under the specific sample from $\mathcal{D}$. Taking the expectation yields the expected mode insertion gradient $\mathbb{E}_\mathcal{D}[\partial_+ J/\partial \epsilon |_{\epsilon=0}]$, which is obtained by replacing ρ(τ) in (10) with $\mathbb{E}_\mathcal{D}[\sigma(\tau)]$.

Under a weak regularity condition on the dynamics function (1) and for the cost J defined by (3), (4), (5), it can be shown that the trajectory x of the vehicle 100 is bounded for all admissible control, and that the difference between the perturbed cost $J^\epsilon$ and the nominal cost J is bounded by a linear function of $\epsilon \geq 0$:

$$|J^\epsilon - J| \leq \epsilon K, \quad (12)$$

provided that they both use the same random sample from $\mathcal{D}$. The value of the constant K is deterministic. Therefore, the dominated convergence theorem provides for interchanging the derivative and the expectation:

$$\mathbb{E}_\mathcal{D}\left[\frac{\partial_+ J}{\partial \epsilon}\bigg|_{\epsilon=0}\right] = \frac{\partial_+ \mathbb{E}_\mathcal{D}[J]}{\partial \epsilon}\bigg|_{\epsilon=0} \quad (13)$$

The right-hand side of (13) is the mode insertion gradient generalized to the case of risk-neutral stochastic optimal control (i.e. Problem 1). If the optimal value with respect to v is negative for some τ, then there exists a sufficiently small ∈ for which the perturbation defined by (v, τ, ∈) will reduce the expected cost. If instead it is zero, the nominal control effectively satisfies a local optimality condition. The following provides a derivation of the generalized mode insertion gradient for the entropic risk measure $R_{\mathcal{D},\sigma}(J)$, according to the previously described context in (1)-(13). Lemma 1: Suppose that the total cost J satisfies (12). Then, for σ>0 the following relation holds:

$$\mathbb{E}_\mathcal{D}\left[\frac{\partial_+ e^{\sigma J}}{\partial \epsilon}\bigg|_{\epsilon=0}\right] = \frac{\partial_+ \mathbb{E}_\mathcal{D}[e^{\sigma J}]}{\partial \epsilon}\bigg|_{\epsilon=0} \quad (14)$$

Proof: Let $J^\epsilon$ and J be the perturbed and the nominal cost, respectively.

$$\left|e^{\sigma J^\epsilon} - e^{\sigma J}\right| - \frac{|e^{\sigma(J^\epsilon - J)} - 1|}{e^{\sigma J}} \leq e^{\sigma|J^\epsilon - J|} - 1, \quad (15)$$

where $|e^x - 1| \leq e^{|x|} - 1$ and $e^{\sigma J} \geq 1$. Substituting (12) and dividing by ∈>0, which obtains:

$$\frac{|e^{\sigma J^\epsilon} - e^{\sigma J}|}{\epsilon} \leq \frac{e^{\sigma K \epsilon} - 1}{\epsilon} \quad (16)$$

Let g(∈) denote the right-hand side of the inequality, which is a strictly monotone increasing function for ∈>0. Now let $|f_\epsilon(J)|$ denote the left-hand side as a function of J parameterized by ∈. Take some positive $\epsilon_0$ and a sequence $\{\epsilon_n\}_{n \geq 0}$ converging to $0^+$ as n→∞. It follows that ∀n≥0, $|f_{\epsilon_n}(J)| \leq g(\epsilon_0)$. The dominated convergence theorem applies as $g(\epsilon_0)$ is a finite, deterministic constant:

$$\mathbb{E}_\mathcal{D}\left[\lim_{n\to\infty}(f_{\epsilon_n}(J))\right] = \lim_{n\to\infty}\mathbb{E}_\mathcal{D}[f_{\epsilon_n}(J)], \quad (17)$$

which is equivalent to (14). Theorem 1 (Mode Insertion Gradient of Entropic Risk): Suppose that the regularity condition is met so the trajectory x of the vehicle 100 is bounded under admissible control and the cost J satisfies (12). Then, for fixed v and τ the mode insertion gradient of the entropic risk measure $$\frac{\partial_+}{\partial \epsilon} R_{\mathcal{D},\sigma}(J)\bigg|_{\epsilon=0}$$

exists and is given by $$\frac{\partial_+}{\partial \epsilon} R_{\mathcal{D},\sigma}(J)\bigg|_{\epsilon=0} = \quad (18)$$

$$\frac{1}{2}v^T R v + \frac{\mathbb{E}_\mathcal{D}[e^{\sigma J}\rho(\tau)]^T}{\mathbb{E}_\mathcal{D}[e^{\sigma J}]} H(x(\tau))(v - u(\tau)) - \frac{1}{2}u(\tau)^T R u(\tau),$$

Where J inside the expectations is the cost value under nominal control u. Proof: As the robot trajectory is bounded, J is a bounded random variable, and the value of $R_{\mathcal{D},\sigma}(j)$ is finite. The chain rule gives:

$$\frac{\partial_+}{\partial \epsilon} R_{\mathcal{D},\sigma}(J)\bigg|_{\epsilon=0} = \frac{1}{\sigma \mathbb{E}_\mathcal{D}[e^{\sigma J}]} \frac{\partial_+ \mathbb{E}_\mathcal{D}[e^{\sigma J}]}{\partial \epsilon}\bigg|_{\epsilon=0} \quad (19)$$

$$= \frac{1}{\mathbb{E}_\mathcal{D}[e^{\sigma J}]} \mathbb{E}_\mathcal{D}\left[e^{\sigma J} \frac{\partial_+ J}{\partial \epsilon}\bigg|_{\epsilon=0}\right], \quad (20)$$

also applying Lemma 1. Substituting (10) and simplifying the terms complete the proof. The mode insertion gradient of entropic risk (18) is a generalization of the stochastic mode insertion gradient (13). Indeed, for the risk-neutral case (i.e. σ=0) the two equations match. This enables the extension of the Stochastic SAC algorithm to risk-sensitive optimal control problems without changing the structure of the algorithm.

The RSSAC includes the following optimization problem, which substitutes Problem 1 (if σ=0) and 2 (if σ>0). Problem 3 (Mode Insertion Gradient Optimization):

$$\underset{v,\tau}{\text{minimize}} \quad \frac{\partial_+}{\partial \epsilon} R_{\mathcal{D},\sigma}(J)|_{\epsilon=0}$$

$$\text{subject to} \quad \tau \in (t_0 + t_{calc}, t_{\tau_-}$$

$$v(\tau) \in \mathcal{U} \forall_\tau \in (t_0, t_T),$$

where $t_{calc}$ is a computation time budget. The objective can be evaluated by Monte Carlo sampling the joint dynamics (1), (2) under the nominal control and backward integration of the adjoint dynamics (11). Fixing τ, Problem 3 is a quadratic minimization (e.g., a quadratic optimization in stochastic sequential action control) over v under a convex constraint. The control module 230 can obtain the optimal value $v^*(\tau)$ analytically for simple constraints such as a box constraint or a norm inequality constraint with a scaled identity matrix R.

Optimizing $\tau$ is equivalent to solving $v^*(\tau)$ multiple times and searching for the minimum value. There is a finite number of ($\tau$) to consider since in practice the control module 230 is implemented to use numerical integration, such as the Euler scheme with some discrete step size, to integrate the dynamics of the vehicle 100. The optimal mode insertion gradient is non-positive, and if it is negative then there exists some $\epsilon > 0$ such that the entropic risk measure is reduced as a result of the control perturbation. The value of $\epsilon$ can be either specified or searched. If instead the mode insertion gradient is zero, the control module 230 sets $\epsilon = 0$ and chooses not to perturb.

The pseudo-code of the RSSAC algorithm is presented in Algorithm 1 as one example of how the RSSAC algorithm may be implemented.

---

Algorithm 1: Control Computation with RSSAC

---

INPUT: Initial joint state s(t$_0$), reference trajectory r, nominal control schedule u
OUTPUT: Optimally perturbed control schedule u$^\epsilon$
1: for j = 1: M do
2: Forward-simulate the joint dynamics (1), (2) while sampling identified object transitions
   $\{y_k^i\}_{\{1 \le i \le N, 1 \le k \le T\}}^j$ from $\mathcal{D}$
3: Compute sampled cost $J^j$
4: Backward-simulate adjoint vehicle trajectory $\rho^j$ with sampled object transitions (11)
5: end for
6: Compute Monte Carlo estimate:

$$\mathbb{E}_\mathcal{D}[e^{\sigma J}\rho] \approx \frac{1}{M}\sum_{j=1}^{M} e^{\sigma J^j}\rho^j \text{ and } \mathbb{E}_\mathcal{D}[e^{\sigma J}] \approx \frac{1}{M}\sum_{j=1}^{M} e^{\sigma J^j}$$

7: Solve Problem 3
8: Specify $\epsilon$ or search by re-simulating the dynamics
9: u$^\epsilon$ ← PerturbControlSchedule(u, v*, $\tau$*, $\epsilon$) (8)
10: return u$^\epsilon$

---

The Monte Carlo sampling shown in the pseudo-code is naturally parallelizable, which the control module 230 is, in one or more arrangements, implemented to perform in order to improve computational efficiency. Note that the risk sensitivity has no effect unless there are at least M=2 samples. The re-planning occurs at every $\Delta t_r$ seconds, allowing for a variable number of identified objects to be considered over time. The complexity of the algorithm is O(NMT), where N denotes the number of identified objects, M the number of samples, and T the planning horizon.

As one example of an implementation with the control system 170, the control system 170 may use the double integrator model for the vehicle dynamics: $x(t)=(x_p(t), x_v(t))$, $\dot{x}_p=x_v(t)$, $\dot{x}_v(t)=u(t)$. These dynamics are integrated using the Euler scheme with step size $\Delta t_c=0.02$ [s]. The cost weight matrices are Q=Diag(0.5, 0.5, 0, 0) and R=0.2 $I_{2\times 2}$. For the present example, consider that the collision cost is the following sum of Gaussian functions centered at each identified object:

$$c_{col}(s(t)) = \sum_{i=1}^{N} \alpha \exp\left(-\frac{\|x_p(t) - p^i(t)\|_2^2}{2\lambda}\right) \quad (21)$$

with peak parameter $\alpha=100$ and bandwidth parameter $\lambda=0.2$. The relative weight of the terminal cost is set to $\beta=0.1$. The reference trajectory r is a straight line connecting the initial vehicle position to the goal position (i.e., destination) at a constant target speed, and is replanned whenever $\|x(t)-r(t)\|_2 > 2$ [m]. The control constraint is $\|u(t)\|_2 \le u_{max}$ with $u_{max}=5.0$, 2.5 [m/s$^2$]. Monte Carlo sampling is parallelized on a GPU with sample size M=30. The planning horizon in 4.8 [s], which corresponds to T=12 steps of identified object motion prediction with a measurement interval $\Delta t_0=0.4$ [s].

In contrast to prior work, we searched for $\epsilon$ from {0, 1e$^{-3}$, 2e$^{-3}$, 4e$^{-3}$, 8e$^{-3}$, 1.6e$^{-2}$, 2e$^{-2}$, 4e$^{-2}$, 8e$^{-2}$} [s]. The nominal control u is an MPC-style search algorithm that takes the form:

$$u(t) = \begin{cases} u_s(t) & \text{if } t \in [t_0 + t_{calc}, t_0 + t_{calc} + \Delta t_0] \\ u_{pr}(t), & \text{otherwise} \end{cases} \quad (22)$$

where $u_{pr}$ is the perturbed control from the previous iteration, and $u_s$ is either the same as $u_{pr}$ or chosen from a set of constant control inputs$\{(\alpha\cos(\theta), \alpha\sin(\theta))\}$ with $\alpha \in \{0.4 \, u_{max}, 0.8 \, u_{max}\}$ and $\theta \in \{0, \pi/4, \pi/2, \ldots, 2\pi\}$. The value of $u_s$ is chosen based on the evaluation of $R_{\mathcal{D},\sigma}$ (J) for each nominal control candidate using the Monte Carlo samples. Accordingly, in this way, the control module 230 uses the information from the detection module 220 to generate controls for autonomously controlling the vehicle 100 while considering risk according to a defined risk parameter that quantifies an extent of risk to be undertaken in motion of the vehicle 100 according to the generated controls. This permits the vehicle 100 to implement an optimized control regime that best balances risk with, for example, safety and comfort of the passengers while doing so in a single stream computationally efficient process.

Figure 3:
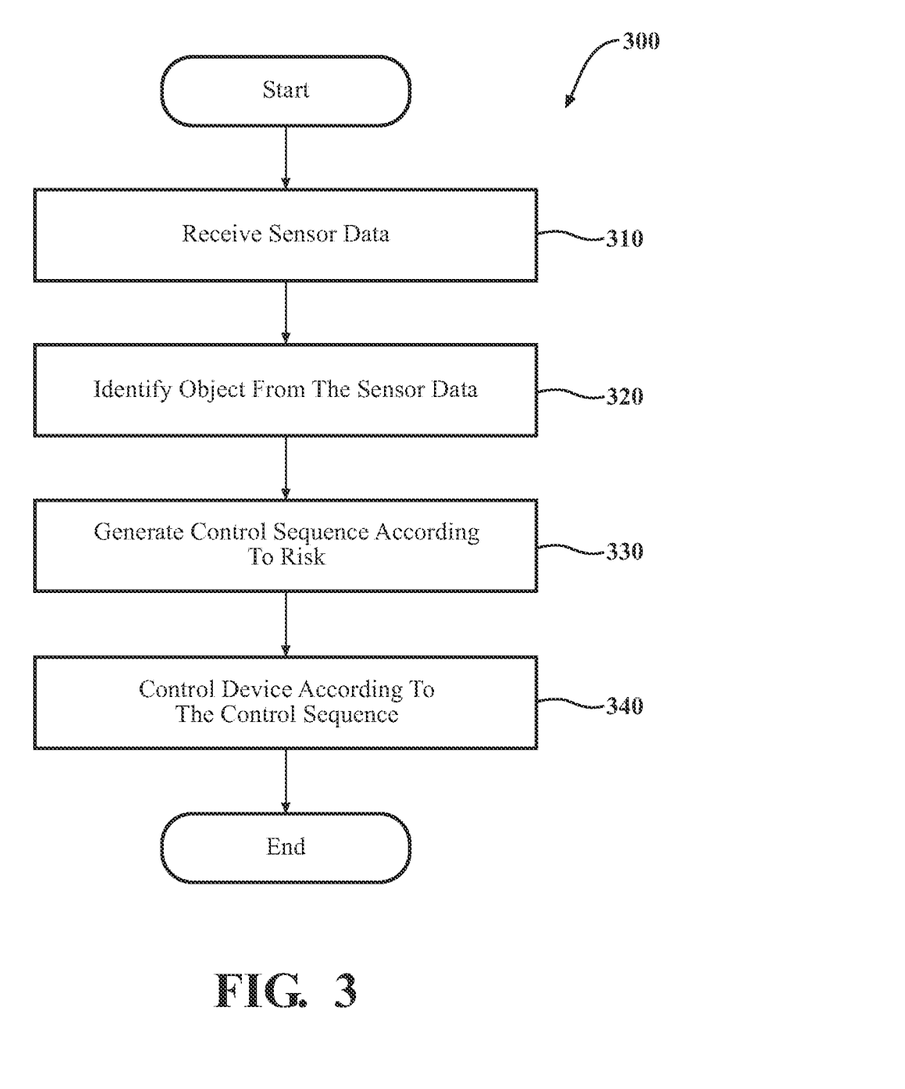
FIG. 3 is a flowchart of one embodiment of a method associated with risk-sensitive control generation in a device.

Additional aspects of generating controls for an autonomous device using an RSSAC algorithm will be discussed in relation to FIG. 3. FIG. 3 illustrates a flowchart of a method 300 that is associated with generating sequences of controls. Method 300 will be discussed from the perspective of the control system 170 of FIGS. 1-2. While method 300 is discussed in combination with the control system 170, it should be appreciated that the method 300 is not limited to being implemented within the control system 170 but is instead one example of a system that may implement the method 300.

At 310, the detection module 220 acquires the sensor data 250. In one embodiment, the detection module 220 acquires the sensor data 250 locally from co-located systems with the control system 170 (e.g., the camera 126), while in further embodiments, the detection module 220 may acquire the sensor data 250 through a communication link with a remote system. Thus, while the control system 170 can be implemented within a particular device that is, for example, actively navigating an environment, the control system 170 may acquire at least a portion of the sensor data 250 from a remote platform. As previously described, the sensor data 250 itself may have different characteristics according to different implementations but generally includes observations of a surrounding environment from which objects may be identified.

At 320, the detection module 220 identifies at least one object from the sensor data 250. In various approaches, the detection module 220 may segment the object from the sensor data using a segmentation model to provide segmented data representing individual objects in the surrounding environment. Of course, in further implementations, the detection module 220 may implement other routines or models to generate the segmented data. In any case, the detection module 220 generally functions to acquire the sensor data 250 and derive observations of objects therefrom. Thus, the detection module 220 performs various functions to facilitate the derivation of observations about the surrounding environment from which further determinations may be performed. Moreover, it should be appreciated that the identified objects are, in general, dynamic objects that are moving or are likely to move in the surrounding environment.

Additionally, as part of identifying the objects, at 320, in one or more arrangements, the detection module 220 generates trajectories for the identified objects. For example, the detection module 220 may use a behavior prediction model that updates predictions about trajectories at a defined interval, such as every x seconds and/or whenever a subsequent acquisition of the sensor data 250 identifies further aspects about the identified objects. In any case, the detection module 220 can provide samples of the trajectories as inputs to the RSSAC algorithm employed by the control module 230 in order to inform the generation of the control sequence about locations and movements of the identified objects. As an additional aspect, in one arrangement, the detection module 220 may perform other functions in support of the control module 230. For example, the detection module 220 may determine an initial state of the vehicle 100, a reference trajectory indicating a desired path of the vehicle 100 (e.g., a destination and general direction), a nominal control schedule for controlling the vehicle 100 over the reference trajectory, and/or any other information used by the control module 230. In this way, the detection module 220 can gather the information used by the control module 230 in support of generating the control sequence.

At 330, the control module 230 generates a control sequence for controlling the vehicle 100 according to a risk-sensitivity parameter to navigate toward a destination while considering risk associated with encountering the objects defined by the risk-sensitivity parameter. As set forth above, the risk parameter σ functions to guide the risk sensitivity of the creation of the control sequence by the control module 230. In any case, the control module 230 may re-generate the control sequence iteratively and at a different frequency than at which the detection module 220 updates the information about the identified objects. Accordingly, while blocks 310, 320, 330, and 340 are illustrated sequentially, the blocks may execute at different frequencies in parallel. As such, the control module 230 generally uses samples of the trajectories from a most recent update, current vehicle dynamics that may also be simulated out to a prediction horizon, and a nominal control schedule (e.g., a control schedule that maintains a current path) as inputs into the model 260 (i.e., the RSSAC algorithm). Accordingly, the control module generates the control sequence according to model 260 and stores the control sequence in a scheduler queue for use in subsequently controlling the vehicle 100.

At 340, the control module 230 controls the vehicle 100 according to the control sequence. For example, the control module 230 provides the control sequence to the vehicle 100 via a queue or other mechanism that causes the vehicle 100 to use the controls (i.e., steering, accelerating, braking, etc.) to navigate the vehicle 100. In at least one arrangement, the control module 230 provides the control sequence to the automated driving module 160, which integrates the control sequence as part of further autonomous functions to control the vehicle 100.

Figure 4:
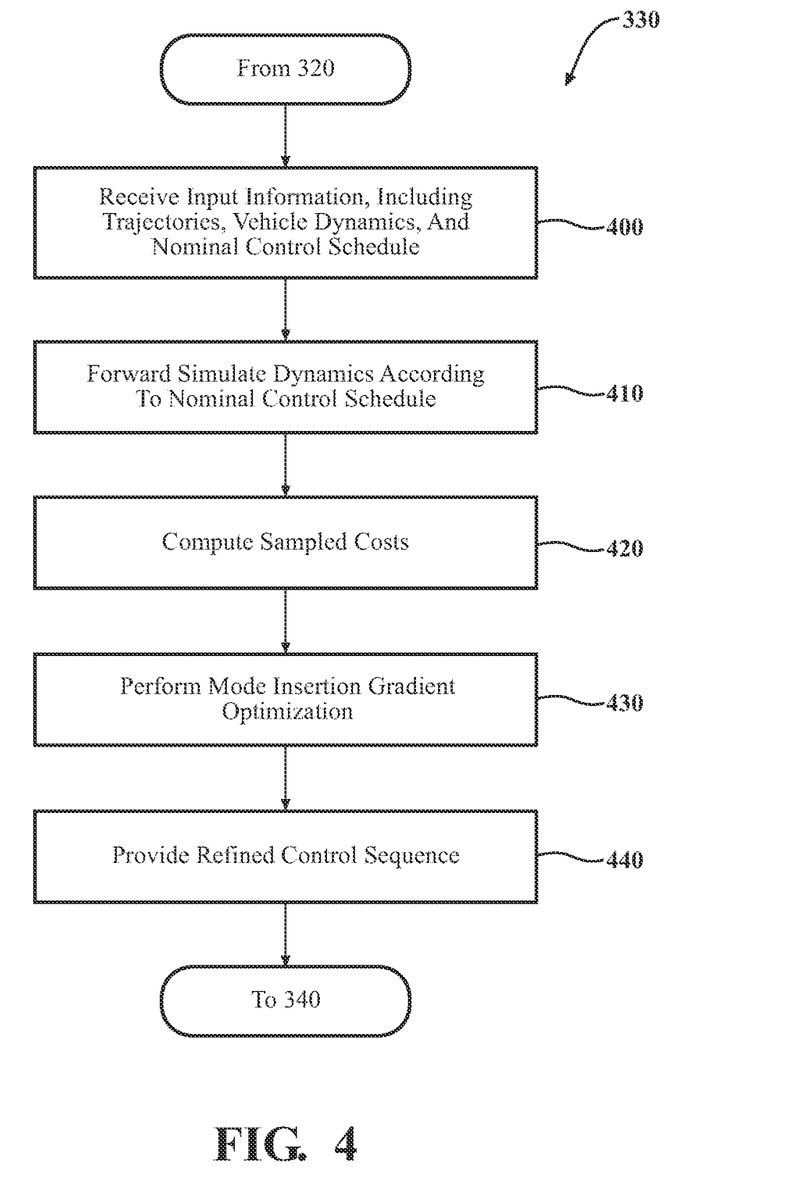
FIG. 4 is a flowchart of one embodiment of a method associated with a risk-sensitive sequential action control approach to controlling a device.

As a further explanation of block 330 and how the control module 230 generates the control sequence, FIG. 4 will now be discussed. FIG. 4 illustrates a flowchart of additional operations that may be included as part of block 330 of FIG. 3.

At 400, the control module 230 receives information that is subsequently used with the model 260 to generate the control sequence. As previously outlined, the inputs may include trajectories for the identified objects, dynamics of the vehicle 100, and a nominal control schedule. Additionally, it should be noted that the risk parameter that controls the risk sensitivity of the model 260 (i.e., the RSSAC algorithm) may be predefined according to a learned risk sensitivity that is best suited for the particular vehicle 100, driving context (i.e., weather conditions, geographic location, traffic, etc.), and/or preference of the passengers. Of course, in further circumstances, the detection module 220 may dynamically assess the driving context and adapt the risk parameter according to the noted parameters. In any case, the risk parameter dictates the extent of risk that is integrated into the determination of the control sequence by the model 260.

At 410, the control module 230 forward simulates the dynamics. For example, in at least one arrangement, the control module 230 simulates future aspects of the dynamics according to the current dynamics and the nominal control schedule. Thus, while the nominal control schedule represents controls for maintaining a currently planned path, the future dynamics may vary according to the current dynamics over the nominal control schedule. As such, the control module 230 simulates these dynamics in order to estimate aspects that may influence adjustments to the control sequence.

At 420, the control module 230 computes sampled costs. The sampled costs are aspects associated with the trajectories of the identified objects. Accordingly, the control module 230 samples the values of the trajectories to provide awareness of potential paths of the identified objects that then relate potentials for collisions with the vehicle 100.

At 430, the control module 230 performs mode insertion gradient optimization of a risk objective according to the model 260. The risk objective is embodied by the risk parameter and the optimization further uses dynamics of the vehicle 100 and sampled costs associated with trajectories of the identified objects to generate the control sequence. As shown above, the control module 230 generally solves Problem 3 to achieve this aspect. Accordingly, the control module 230 is estimating the control sequence to refine a nominal sequence according to the risk parameter and according to the trajectories of the objects in order to avoid collisions with the objects. This process and block 330 overall is generally performed iteratively to refine the control sequence according to a quadratic optimization in stochastic sequential action control.

At 440, the control module 230 provides the optimal control sequence according to the variables provided into the model 260.

Figure 5:
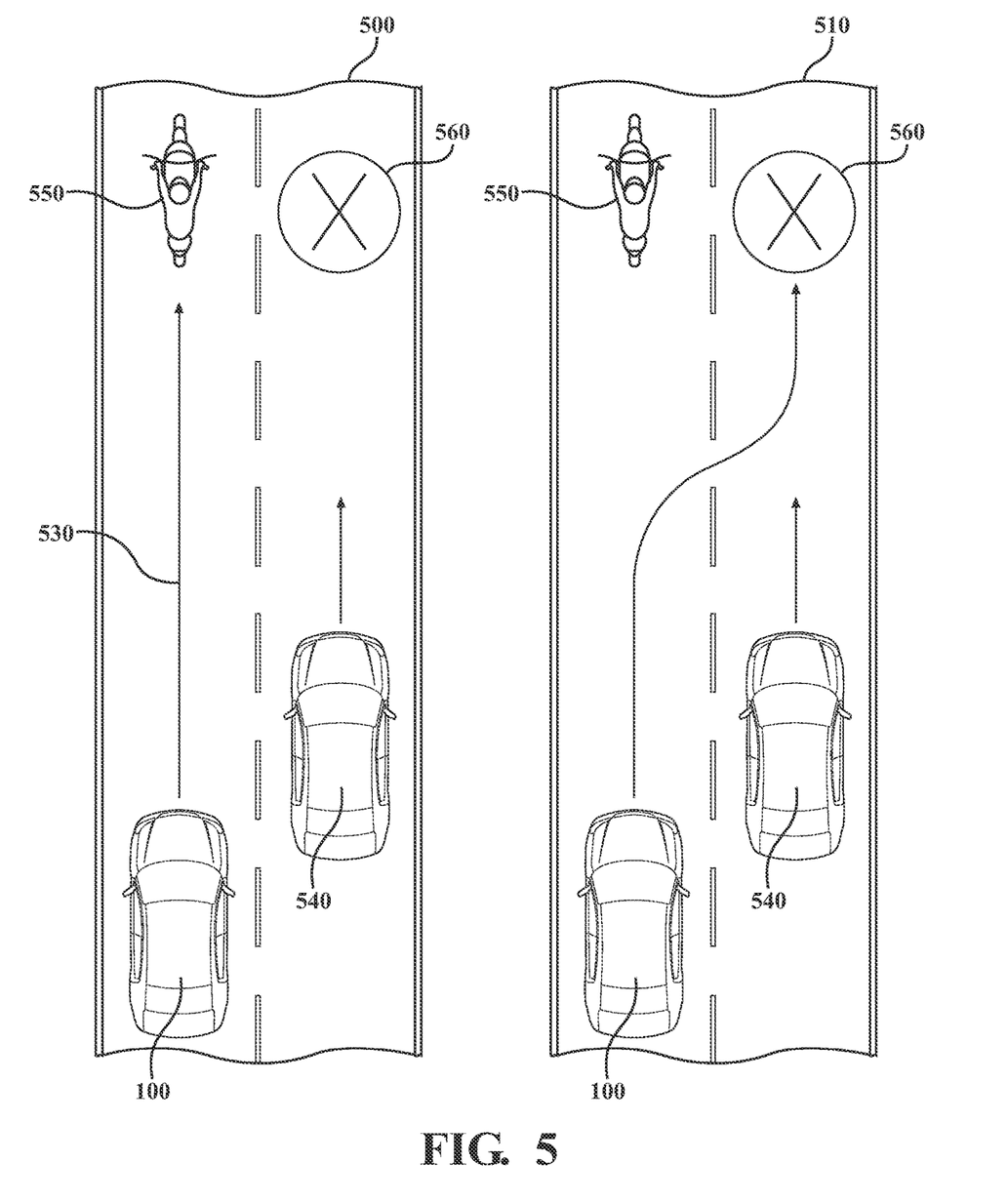
FIG. 5 illustrates a diagram of one example scenario.

Further explanation of how the control system 170 generates risk-aware controls will be described in relation to examples that are illustrated in FIG. 5. FIG. 5 illustrates an example of two separate scenarios 500 and 510. In scenario 500, the risk parameter is set high such that the vehicle 100 is generally risk averse meaning that when predicted future positions of the vehicle 100 approach predicted trajectories of identified objects, the control system 170 generates the control sequences to avoid these encounters. Thus, in scenario 500, the control system 170 may generate the controls resulting in trajectory 530 to avoid vehicle 540 and motorcycle 550 by, for example, maintaining a current lane and slowing the vehicle 100. However, such a maneuver may not be ideal since the motorcycle 550 may be impeding a path of the vehicle 100, thereby resulting in inefficient control. Thus, while movement to a position 560 may be ideal, an associated maneuver may exhibit too much risk according to a setting of the risk parameter.

By contrast, in scenario 510, the risk parameter is set relatively lower such that the control system 170 exhibits greater risk in generating the controls. Thus, as shown, according to predicted trajectories of the vehicle 540 and the motorcycle 550, in scenario 510 the control system 170 generates the controls to include a lane change in front of the vehicle 540 and around the motorcycle 550. Accordingly, while this maneuver into position 560 may be riskier, the decreased risk parameter associated with scenario 510 permits this approach.

FIG. 1 will now be discussed in full detail as an example environment within which the system and methods disclosed herein may operate. In some instances, the vehicle 100 is configured to switch selectively between an autonomous mode, one or more semi-autonomous operational modes, and/or a manual mode. Such switching can be implemented in a suitable manner, now known or later developed. "Manual mode" means that all of or a majority of the navigation and/or maneuvering of the vehicle is performed according to inputs received from a user (e.g., human driver). In one or more arrangements, the vehicle 100 can be a conventional vehicle that is configured to operate in only a manual mode.

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangements, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangements, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such a case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1). The sensor system 120 can acquire data of at least a portion of the external environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described. As an example, in one or more arrangements, the sensor system 120 can include one or more radar sensors 123, one or more LIDAR sensors 124, one or more sonar sensors 125, and/or one or more cameras 126. In one or more arrangements, the one or more cameras 126 can be high dynamic range (HDR) cameras or infrared (IR) cameras.

The vehicle 100 can include an input system 130. An "input system" includes any device, component, system, element or arrangement or groups thereof that enable information/data to be entered into a machine. The input system 130 can receive an input from a vehicle passenger (e.g., a driver or a passenger). The vehicle 100 can include an output system 135. An "output system" includes any device, component, or arrangement or groups thereof that enable information/data to be presented to a vehicle passenger (e.g., a person, a vehicle passenger, etc.).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system, or a geolocation system.

The processor(s) 110, the control system 170, and/or the automation module(s) 160 can be operatively connected to communicate with the various vehicle systems 140 and/or individual components thereof. For example, returning to FIG. 1, the processor(s) 110 and/or the automation module(s) 160 can be in communication to send and/or receive information from the various vehicle systems 140 to control the movement, speed, maneuvering, heading, direction, etc. of the vehicle 100. The processor(s) 110, the control system 170, and/or the automation module(s) 160 may control some or all of these vehicle systems 140 and, thus, may be partially or fully autonomous.

The processor(s) 110, the control system 170, and/or the automation module(s) 160 can be operatively connected to communicate with the various vehicle systems 140 and/or individual components thereof. For example, returning to FIG. 1, the processor(s) 110, the control system 170, and/or the automation module(s) 160 can be in communication to send and/or receive information from the various vehicle systems 140 to control the movement, speed, maneuvering, heading, direction, etc. of the vehicle 100. The processor(s) 110, the control system 170, and/or the automation module(s) 160 may control some or all of these vehicle systems 140.

The processor(s) 110, the control system 170, and/or the automation module(s) 160 may be operable to control the navigation and/or maneuvering of the vehicle 100 by controlling one or more of the vehicle systems 140 and/or components thereof. For instance, when operating in an autonomous mode, the processor(s) 110, the control system 170, and/or the automation module(s) 160 can control the direction and/or speed of the vehicle 100. The processor(s) 110, the control system 170, and/or the automation module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be any element or combination of elements operable to modify, adjust and/or alter one or more of the vehicle systems 140 or components thereof to responsive to receiving signals or other inputs from the processor(s) 110 and/or the automation module(s) 160. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more automation modules 160. The automation module(s) 160 can be configured to receive data from the sensor system 120 and/or any other type of system capable of capturing information relating to the vehicle 100 and/or the external environment of the vehicle 100. In one or more arrangements, the automation module(s) 160 can use such data to generate one or more driving scene models. The automation module(s) 160 can determine position and velocity of the vehicle 100. The automation module(s) 160 can determine the location of obstacles, obstacles, or other environmental features including traffic signs, trees, shrubs, neighboring vehicles, pedestrians, etc.

The automation module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The automation module(s) 160 either independently or in combination with the control system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The automation module(s) 160 can be configured to implement determined driving maneuvers. The automation module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The automation module(s) 160 can be configured to execute various vehicle functions and/or to transmit data to, receive data from, interact with, and/or control the vehicle 100 or one or more systems thereof (e.g., one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-5, but the embodiments are not limited to the illustrated structure or application.

The flowcharts and block diagrams in the Figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, module, as used herein, includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A control system for improving controls in a device according to risk, comprising:
one or more processors;
a memory communicably coupled to the one or more processors and storing:
a detection module including instructions that, when executed by the one or more processors, cause the one or more processors to, in response to receiving sensor data about a surrounding environment of the device, identify objects from the sensor data that are present in the surrounding environment; and
a control module including instructions that, when executed by the one or more processors, cause the one or more processors to generate a control sequence for controlling the device according to a risk-sensitivity parameter to navigate toward a destination while considering risk associated with encountering the objects defined by the risk-sensitivity parameter, the risk-sensitivity parameter being selectable along a continuum to define an extent of variability that is acceptable in a collision cost in addition to a mean for controlling the device, and
control the device according to the control sequence.

2. The control system of claim 1, wherein the control module includes instructions to generate the control sequence including instructions to perform mode insertion gradient optimization of a risk objective embodied by the risk parameter using dynamics of the device and sampled costs associated with trajectories of the objects, and
wherein the risk-sensitivity parameter accounting for a distribution of the collision cost to adapt generating the control sequence beyond a discrete optimization.

3. The control system of claim 1, wherein the control module includes instructions to generate the control sequence by performing mode insertion gradient optimization including simulating dynamics of the device forward in time out to a prediction horizon.

4. The control system of claim 1, wherein the control module includes instructions to generate the control sequence by performing mode insertion gradient optimization including instructions to estimate the control sequence to refine a nominal sequence according to the risk parameter and according to trajectories of the objects in order to avoid collisions with the objects.

5. The control system of claim 1, wherein the control module includes instructions to control the device including instructions to apply one or more controls specified by the control sequence to control movements of the device, and
wherein the control module includes instructions to generate the control sequence iteratively to refine the control sequence according to a quadratic optimization in stochastic sequential action control.

6. The control system of claim 1, wherein the detection module includes instructions to identify the objects including instructions to predict trajectories of the objects according to a generative behavior prediction model out to a prediction time horizon, and wherein the control module includes instructions to generate the control sequence according to a risk-sensitive sequential action control algorithm that is a sampling-based stochastic model predictive control approach that is risk aware.

7. The control system of claim 1, wherein the detection module includes instructions to identify the objects including instructions to determine an initial state of the device, including dynamics and a current location, a reference trajectory indicating a desired path of the device, and a nominal control schedule for controlling the device over the reference trajectory.

8. The control system of claim 1, wherein the device is an autonomous vehicle.

9. A non-transitory computer-readable medium for improving controls in a device according to risk and including instructions that when executed by one or more processors cause the one or more processors to:

in response to receiving sensor data about a surrounding environment of the device, identify objects from the sensor data that are present in the surrounding environment;

generate a control sequence for controlling the device according to a risk-sensitivity parameter to navigate toward a destination while considering risk associated with encountering the objects defined by the risk-sensitivity parameter, the risk-sensitivity parameter being selectable along a continuum to define an extent of variability that is acceptable in a collision cost in addition to a mean for controlling the device; and control the device according to the control sequence.

10. The non-transitory computer-readable medium of claim 9, wherein the instructions to generate the control sequence include instructions to perform mode insertion gradient optimization of a risk objective embodied by the risk parameter using dynamics of the device and sampled costs associated with trajectories of the objects, and wherein the risk-sensitivity parameter accounting for a distribution of the collision cost to adapt generating the control sequence beyond a discrete optimization.

11. The non-transitory computer-readable medium of claim 9, wherein the instructions to control the device include instructions to apply one or more controls specified by the control sequence to control movements of the device, and wherein the instructions to generate the control sequence execute iteratively to refine the control sequence according to a quadratic optimization in stochastic sequential action control.

12. The non-transitory computer-readable medium of claim 9, wherein the instructions to identify the objects include instructions to predict trajectories of the objects according to a generative behavior prediction model out to a prediction time horizon, and wherein the instructions to generate the control sequence apply a risk-sensitive sequential action control algorithm that is a sampling-based stochastic model predictive control approach that is risk aware.

13. The non-transitory computer-readable medium of claim 9, wherein the instructions to identify the objects include instructions to determine an initial state of the device, including dynamics and a current location, a reference trajectory indicating a desired path of the device, and a nominal control schedule for controlling the device over the reference trajectory.

14. A method of improving controls in a device according to risk, comprising:

in response to receiving sensor data about a surrounding environment of the device, identifying objects from the sensor data that are present in the surrounding environment;

generating a control sequence for controlling the device according to a risk-sensitivity parameter to navigate toward a destination while considering risk associated with encountering the objects defined by the risk-sensitivity parameter, the risk-sensitivity parameter being selectable along a continuum to define an extent of variability that is acceptable in a collision cost in addition to a mean for controlling the device; and controlling the device according to the control sequence.

15. The method of claim 14, wherein generating the control sequence includes performing mode insertion gradient optimization of a risk objective embodied by the risk parameter using dynamics of the device and sampled costs associated with trajectories of the objects, and wherein the risk-sensitivity parameter accounting for a distribution of the collision cost to adapt generating the control sequence beyond a discrete optimization.

16. The method of claim 14, wherein generating the control sequence by performing mode insertion gradient optimization includes simulating dynamics of the device forward in time out to a prediction horizon.

17. The method of claim 14, wherein generating the control sequence by performing mode insertion gradient optimization includes estimating the control sequence to refine a nominal sequence according to the risk parameter and according to trajectories of the objects in order to avoid collisions with the objects.

18. The method of claim 14, wherein controlling the device includes applying one or more controls specified by the control sequence to control movements of the device, and wherein generating the control sequence occurs iteratively to refine the control sequence according to a quadratic optimization in stochastic sequential action control.

19. The method of claim 14, wherein identifying the objects includes predicting trajectories of the objects according to a generative behavior prediction model out to a prediction time horizon, and wherein generating the control sequence is a sampling-based stochastic model predictive control approach that is risk aware.

20. The method of claim 14, wherein identifying the objects includes determining an initial state of the device, including dynamics and a current location, a reference trajectory indicating a desired path of the device, and a nominal control schedule for controlling the device over the reference trajectory.

* * * * *